US 6,608,552 B1

(12) United States Patent
Fogel et al.

(10) Patent No.: US 6,608,552 B1
(45) Date of Patent: Aug. 19, 2003

(54) POWER-LINE DIGITAL COMMUNICATION SYSTEM

(75) Inventors: Meir Fogel, Rehovot (IL); Dov Raviv, Rishon Lezion (IL); Daniel Rubin, Nes Ziona (IL); Dov Wulich, Meitar (IL)

(73) Assignee: Systel Development & Industries Ltd., Rehovot (IL)

( * ) Notice: Subject to any disclaimer, the term of this patent is extended or adjusted under 35 U.S.C. 154(b) by 0 days.

(21) Appl. No.: 09/856,565
(22) PCT Filed: Nov. 23, 1999
(86) PCT No.: PCT/IL99/00631
§ 371 (c)(1),
(2), (4) Date: May 23, 2001
(87) PCT Pub. No.: WO00/31934
PCT Pub. Date: Jun. 2, 2000

(30) Foreign Application Priority Data

Nov. 24, 1998 (IL) .................................................. 127223

(51) Int. Cl.⁷ ............................................. H04M 11/04
(52) U.S. Cl. .................................. 340/310.01; 375/267
(58) Field of Search ..................... 340/310.01; 375/267, 375/347; 455/101, 103

(56) References Cited

U.S. PATENT DOCUMENTS

| | | | |
|---|---|---|---|
| 4,563,650 A | | 1/1986 | York et al. |
| 5,278,862 A | | 1/1994 | Vander Mey |
| 5,404,127 A | | 4/1995 | Lee et al. |
| 5,448,593 A | | 9/1995 | Hill |
| 5,504,774 A | | 4/1996 | Takai et al. |
| 5,504,783 A | * | 4/1996 | Tomisato et al. ........... 375/267 |
| 5,579,335 A | | 11/1996 | Sutterlin et al. |

* cited by examiner

Primary Examiner—John Tweel
(74) Attorney, Agent, or Firm—Mark M. Friedman

(57) ABSTRACT

A method of transmitting data over power lines, a decoder of the transmitted data, and a lighting control system that uses the method. The data are represented as symbols that are encoded in groups of successive bursts of alternating signals, with each burst assigned one of M frequencies. Upon reception, the groups are decoded by a decoder that converts the received bursts into a binary form which is correlated with M binary reference signals by XORing and counting the resulting pulses up or down. The correlation values are added separately for each possible symbol value, with the highest score indicating the decoded symbol.

31 Claims, 11 Drawing Sheets

| Symbol value | burst 1 | burst 2 | burst 3 | burst 4 |
|---|---|---|---|---|
| A | f1 | f2 | f3 | f4 |
| B | f2 | f3 | f4 | f5 |
| C | f3 | f4 | f5 | f6 |
| D | f4 | f5 | f6 | f1 |
| E | f5 | f6 | f1 | f2 |
| F | f6 | f1 | f2 | f3 |

FIG. 2B

POWER-LINE DIGITAL COMMUNICATION SYSTEM

FIELD AND BACKGROUND OF THE INVENTION

The present invention relates to a system for transmitting data over power-carrying wires and, more particularly, to a system, for carrying commands and control signals over power-carrying wires to lamp controllers, that is relatively immune to disturbances prevalent on such wires.

In a controlled lighting system, such as deployed particularly in commercial and industrial premises, there are typically a plurality of lamp clusters, each controlled by a controller, and one or more command stations, from which various lighting functions may be controlled by users. Usually the lamps are of the fluorescent type and a controller includes an electronic ballast—to stabilize the light. An important lighting function is dimming, that is—controlling the light level of each lamp cluster. Commands for changing the light level or for setting it at a desired value are usually issued by the user by means of a command station. Such commands may also be issued by a computer or by some appliance control center (such as deployed in a home). In some systems there are also deployed light level detectors—for monitoring the actual light level at certain points and issuing feedback control signals to the controllers, so as to maintain some predetermined light level.

All such command—and control signals must be transmitted from their respective sources to one or more of the lamp controllers. Such transmission may be effected either by wireless means, or over a pair of wires, dedicated to the purpose, or over wires that primarily serve for the transmission of power and that usually must also be connected to the controllers and to the various command-issuing units. Wireless transmission requires relatively expensive transmitting and receiving equipment for reliable operation, especially for systems with large spatial extent. Transmission over dedicated wires requires that such wires be specially installed; such installation may be relatively expensive, especially in older premises. On the other hand, power mains are ubiquitous in most buildings and easily accessible from all units; moreover, in many lighting systems full power wiring may already exist prior to the installation of the control features and components and thus represents a readily available conduit for the control signals.

The present invention is primarily concerned with method and apparatus for transmitting lighting control signals over power-carrying wires. However, while the invention will be described in terms of an embodiment within a lighting control system, it should be understood to apply, with obvious modifications, also to other systems that require transmission of data or control signals over power-carrying wires, such as heating- and cooling systems, industrial production lines or home appliance control systems.

From the point-of-view of signal transmission, power lines are electrically very noisy, that is—they carry, in addition to the power (at a frequency of 50 or 60 Hertz, and its harmonics), randomly varying voltages of relatively large magnitude. Part of such noise comes over the mains from outside the controlled system and part of it may be generated within the system —e.g., by switching power supplies, electronic ballasts, motors, lamp instabilities etc. The time variation of the noise voltages may be categorized into three groups: (1) continuous wide-band random variation (akin to "white" noise), (2) continuous narrow-band disturbances (about distinct frequencies) and (3) randomly occurring narrow pulses. In order to reliably transmit data in the presence of such noise and disturbances, the transmission method (that is —the characterization of the signals and the manner in which data is encoded onto them and decoded from them) must be optimally designed. Moreover, the impedance of power lines is generally not constant, but rather frequency dependent and variable with time.

Another important characteristic of power-line transmission systems, especially when serving power control signals, is the relatively low rate at which data need generaly be transmitted. Effective data rates of less than a thousand bits per second are usually sufficient. A third, related, characteristic is that the controlled system, with its power wiring, has a limited spatial extent and that the power transmission medium may generally be regarded as dedicated to the system.

An important requirement from most practical power-line transmission systems is that the necessary hardware components, especially those associated with the controlled devices (and thus usually functioning as signal decoders) carry a low cost. This is due to the fact that most of such devices, such as motors, lamp ballasts and regulators, themselves carry relatively low costs.

Most methods of prior art for transmission over power lines have been largely based on methods for transmission over other media, such as wire pairs, coaxial cables and wireless transmission channels. Such methods, well known in the general fields of communications and data transmission, are optimized for transmission conditions on such other media and particularly—for their noise characteristics. The latter are, in most cases, of the wide band type, but in certain systems, one of the other two types mentioned above (continuous distinct frequencies or impulses) may be predominant and the transmission methods optimized for the relevant one of them. Generally, however, few of the known transmission methods is specifically designed to overcome all three mentioned types of disturbances (noise), characteristic to power lines, simultaneously.

Moreover, traditional transmission systems are designed for relatively high rates of data. Although various spectrum-spreading methods are utilized, the available bandwidth generally limits the spread ratio. On the other hand, as has been mentioned hereabove, power system control signal are of relatively low rate and thus it stands to reason to simply modify a known method so as to spread the spectrum widely enough to reliably overcome all noise types prevalent on power lines. In practice, this proves to yield insufficient reliability vs. the achieved transmission rate.

Finally, the hardware components required by systems based on current transmission methods are relatively expensive. Even components currently offered commercially, specifically for power-line communication, are too expensive for most practical lighting systems. The following examples may serve as an indication of typical costs: In a "X-10" system, a remote unit (i.e. one attached to a controlled device) costs about $20. A power-line modem is offered by Echelon Corp. at about $120 and by Intellon Corp.—for $100–200. By contrast, the present invention aims at enabling a remote reception component to sell for between $1 and $10.

U.S. Pat. No. 5,579,335 discloses apparatus and method for decoding signals transmitted over power lines, using band-splitting filters, delay-line correlators, which operate on two separate frequency bands, and further signal processors. The method enables transmission rates in the order of 100 kb/s (which is much higher than required in practical control systems), but the apparatus is inherently expensive.

U.S. Pat. No. 5,448,593 discloses a system for network communication over power lines, which uses two-frequency FSK modulation and an error coding system to control reception quality; upon analyzing errors in the received signal, receiver gain is modified or different frequency pairs are selected for keying or the transmitted bit rate is adjusted. The transceiver apparatus for such a system is, again, inherently expensive and has additional drawbacks in that it (a) assumes stationary noise conditions over a certain period, which is not always the case (especially with impulse-type noise), and (b) requires a reverse transmission path (and thus—additional transmission apparatus), which otherwise is not necessary and further increases system cost.

U.S. Pat. No. 5,448,593 discloses a system for transmitting and detecting signals over power lines to control the dimming of fluorescent lamps. It uses binary FSK and doubles each word transmitted to reduce errors. The detection apparatus is based on analog circuitry, which inherently includes many discrete components and thus is disadvantageously expensive. There is thus a widely recognized need for, and it would be highly advantageous to have, a method and corresponding apparatus for transmitting data over power lines that will be characterized by an acceptable transmission rate, high immunity to all types of disturbances prevalent on power lines and low cost.

SUMMARY OF THE INVENTION

The present invention successfully addresses the shortcomings of the presently known configurations by providing apparatus and method for communicating commands and data over power lines within a lighting control system, and more generally within a power control system, that is relatively inexpensive, yet wherein the data and commands are received with high reliability in the presence of all disturbances and noise commonly present on power lines.

The present invention involves a novel method for encoding the commands and data and for structuring the transmitted signal, as well as a novel architecture of a receiver for reliably and inexpensively detecting and decoding the data carried by a received signal.

More specifically, the encoding method of the present invention calls for structuring the transmitted signal as consecutive time slots, preferably in synchronism with the power frequency —typically one slot per power period. Each slot carries one symbol, selectable from a set of M symbols. Within each time slot there are consecutively transmitted N bursts of carrier frequencies. The frequency of any burst is selectable from a set of M mutually orthogonal frequencies. Typically all N bursts within any one time slot have mutually different frequencies. A unique combination of frequencies for N successive bursts is assigned to each of the M possible symbol values.

In a lighting control system, symbols typically carry commands and data. A command is preferably encoded onto a single symbol, there being M−2 possible different commands, such as "increase light" and "decrease light", which are encoded onto M−2 corresponding symbol values. One symbol value is reserved for denoting "idle" condition (i.e. no commands or data transmitted) and one symbol value denotes "begin data string". Data are encoded onto a string of successive symbols of fixed length, using any known encoding method, possibly including error-detection or error-correction codes, though the latter is generally not necessary when using the disclosed method.

The receiving apparatus, according to the preferred embodiment, consists of a front end, a set of M synchronous detectors which are implemented within a gate array, and a general-purpose microprocessor which is programmed to process detected values so as to identify symbol values and to decode the commands and data. The front end includes an amplifier, a broad band-pass filter and a signal binarizer. Each synchronous detector consists of a pair of correlators, which are fed the binarized input signal and a binary reference signal of a specific frequency (being a unique one of the aforementioned set of M frequencies), and an adder that receives the outputs of both correlators; the reference signal is applied to the two correlators in mutual phase quadrature. Each correlator consists of a XOR gate, followed by an up-down counter and an absolute-value device.

The received signal, after being filtered and binarized in the front-end, is applied to each of the 2M XOR gates, the other input of which is fed with the reference signal. The output of the XOR gate is applied as a gating signal to the up-down counter, which is also fed clock pulses. The counter counts clock pulses up or down according to the output of the XOR gate. At the end of each burst period the count is read out. If the frequency of the burst in the received signal is equal to the reference frequency, the count will generally have a finite value, proportional to the phase between them; if the two frequencies are not equal, the count will be essentially zero. In each of the M detectors, the absolute values of the two counts obtained from the pair of correlators, after each burst period, are added together in the adder and thus represent the phase-independent correlation value between the received burst and the specific frequency of the detector.

The M correlation values are fed to the microprocessor after each burst period and stored there. At the end of each symbol period (the aforementioned time slot), i.e. after each group of N bursts, groups of N stored correlation values are formed according to the association of corresponding frequencies with each of the M symbols (as has been assigned for encoding) and the values within each group are added together. The symbol associated with the highest sum is identified as the detected symbol. Symbols and sequences of symbols are thereafter decoded, by largely conventional methods, to obtain the carried commands and data.

It is noted that the fast digital operations are carried out within the Gate Array, whereas the slower operations are carried out within the microprocessor—which is an efficient and economic way of utilizing their capabilities. Moreover, the microprocessor may concurrently serve other control functions within the lighting- or power control system and the Gate Array may have other sections assigned to other fast control processes.

According to the present invention there is provided a method for transmitting data over power lines, the data being represented by a series of symbols, each symbol having one of a finite number of possible values, the method comprising encoding the series of symbols into a corresponding sequence of groups, each group consisting of N successive bursts of alternating signal, whereby each burst is assigned one of M possible frequencies, no two of said bursts in any one of said groups are assigned the same frequency and there is unique correspondence between the value of any symbol and the frequency of any one of said bursts within the corresponding group.

According to further features of the invention, the method further comprises decoding a group of said successive bursts, upon reception, whereby the decoding includes:

Providing M reference signals, each having a unique one of said M frequencies, and correlating each of said bursts with said M reference signals, resulting in M correlation values for each burst;

for each possible symbol value, selecting for each burst the correlation value that corresponds to the frequency assigned to that symbol value and adding all selected correlation values together, to yield a symbol score; and selecting the highest symbol score to indicate the decoded symbol value.

According to further features in preferred embodiments of the invention described below, the correlation, with respect to each of said M reference signals, includes:

providing the reference signal as a binary valued reference signal;

converting the received signal into a binary valued received signal;

performing a XOR operation between the binary valued reference signal and the binary valued received signal;

providing a continuous train of clock pulses; and counting said clock pulses up or down according to the results of said XOR operation.

Preferably the reference signal is provided as a pair of binary valued reference signals, each having the corresponding frequency and being in mutual phase quadrature and the XOR operation is performed between the binary valued received signal and each of the two binary valued reference signals.

According to still further features in the described preferred embodiments, said groups are timed in synchronism with the power frequency or any of its harmonics and all of said reference signals and the frequencies of all of said bursts are synchronized to a common reference frequency, which preferably is the power frequency.

According to the present invention there is also provided apparatus for decoding a signal received over a power line, the signal having been transmitted as a sequence of groups, each group encoding a data-carrying symbol, having one of a finite number of possible values, and consisting of N successive bursts of alternating signal, whereby each burst has been assigned one of M possible frequencies, the apparatus comprising:

at least one signal generator operative to produce a reference signal, or a pair of reference signals, which are in mutual phase quadrature, for each of the M frequencies;

at least one correlator for each of the M frequencies, operative to correlate the received signal with a corresponding reference signal, and to thus yield a correlation value at the end of each burst;

an adder for each possible symbol value, operative to add corresponding correlation values from a plurality of correlators, obtained at a plurality of bursts, and to thus yield a symbol score; and a selection logic, operative to select from among the outputs of said adders the one with the highest symbol score.

According to further features of the invention, the apparatus further comprises a circuit to convert the received signal into a binary received signal, and a clock pulses generator and said at least one reference signal generator is operative to generate a binary reference signal; and said at least one correlator includes:

a XOR gate, receptive to said binary received signal and a binary reference signal;

an up-down counter, operative to count pulses, obtained from said clock pulses generator, up or down according to the output of said XOR gate;

According to still further features in the described preferred embodiments, the frequency of each of said reference signals is synchronous with the respective one of the assigned M frequencies and the apparatus further comprises a gate array, which includes the correlators and a phase-locked loop.

According to another embodiment of the invention, there is provided a lighting control system, for controlling lamps by means of signals carrying encoded control commands that are transmitted over a power line, the system having the features of the apparatus recited hereabove.

According to further features of the embodiment of the system, the control commands are classifiable into at least two classes, one class being a direct command and another class being a data message, wherein a direct command is encoded as a single symbol and a data message is encoded as a sequence of two or more successive symbols.

BRIEF DESCRIPTION OF THE DRAWINGS

The invention is herein described, by way of example only, with reference to the accompanying drawings, wherein:

FIG. 2B illustrates a typical encoding scheme for the transmitted signal according to the present invention;

DESCRIPTION OF THE PREFERRED EMBODIMENTS

The present invention relates to a system for reliably and economically transmitting signals over power lines. Specifically, the present invention can be used, within a local lighting system, to transmit control signals to electronic ballasts and other lighting controllers and, even more specifically—to digitally controlled electronic ballasts.

The principles and operation of a signal transmission system according to the present invention may be better understood with reference to the drawings and the accompanying description.

Figure 1:
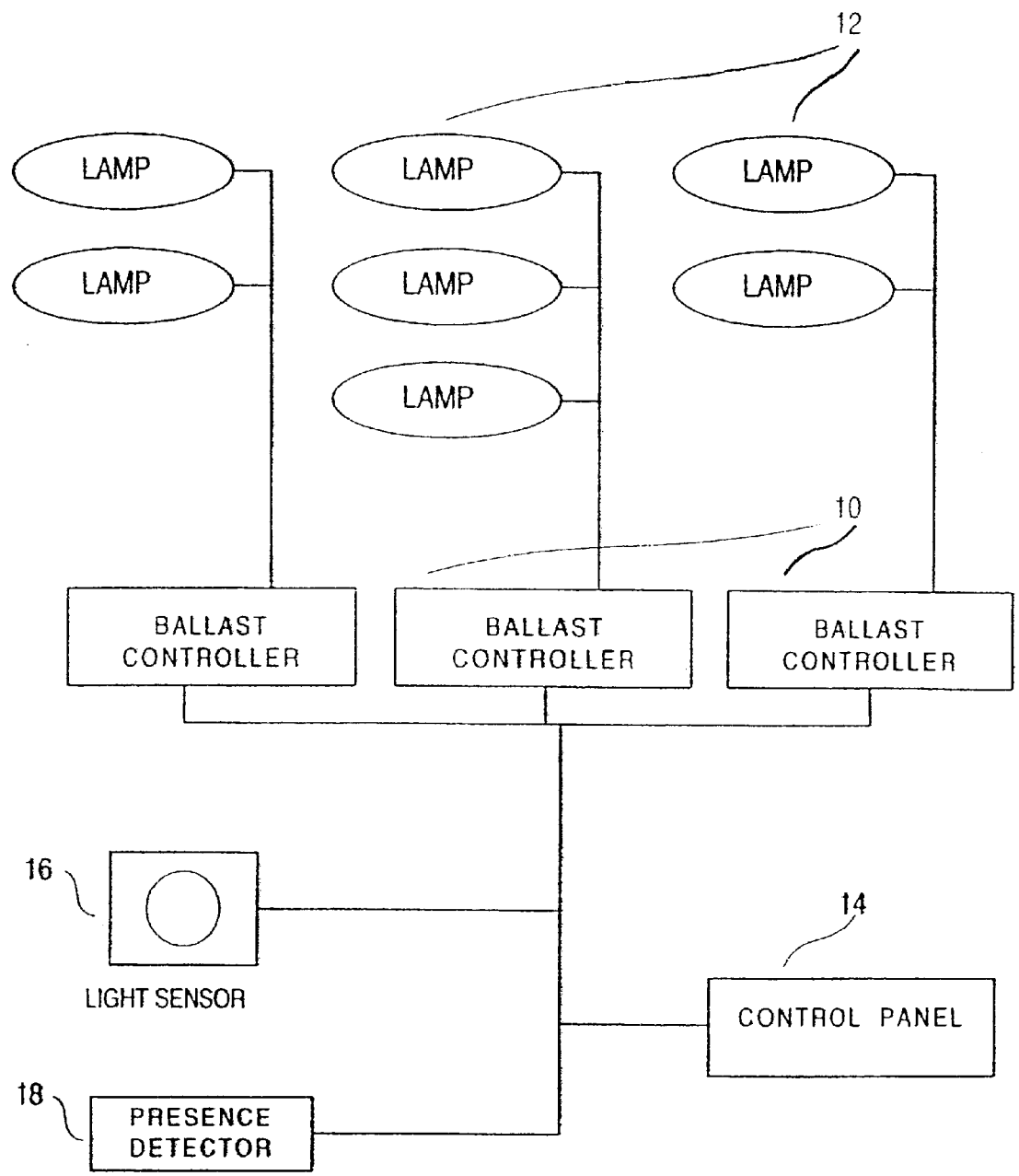
FIG. 1 is a schematic block diagram of a typical digital light control system.

Referring now to the drawings, FIG. 1 illustrates a typical lighting control system that utilizes digitally controlled electronic ballasts. In the exemplary system illustrated, there are three clusters of lamps 12, which may be of the fluorescent type, a control panel 14; a light-level sensor 16 and a personal presence detector 18. To each cluster of lamps is attached a ballast 10 in close proximity. The ballast serves to stabilize the current through the lamps, as well as to control its level (and thus also—the radiated light level). Control panel 14 enables a person to control and alter (e.g. dim or brighten) the light level of each cluster of lamps 12, by issuing commands to ballasts 10. Light-level sensor 16 may aid in accurately controlling the light level in the room, by issuing feedback signals to the control panel. Personal-presence detector 18 detects the presence or absence of persons in the room and correspondingly issues "on" or "off" commands to the ballasts; (an "off" command may, for example, cause the ballasts to dim the light to some very low level).

In the above system it is primarily required to transmit control signals from the control panel to any one of the ballasts; it may also be required to transmit control signals from a sensor to the ballasts or to the control panel. As discussed in the background section hereabove, it is desirable to transmit these signals over the existing power lines. In what follows, the transmission from the control panel to the ballasts will be described; it will, however, be understood that the described methods and apparatus will be also applicable, with minor modifications, to other paths in the lighting system and, indeed, to other systems with similar requirements.

Typically there may be two categories of control signals: "Direct" [or "Immediate" or "command"] control and "Indirect" [or "Parametric" or "data"] control. Direct control signals are typically very short, being representable by, say, two bits of information and preferably carry "Increase", "Decrease" and "Idle" commands. These serve, respectively, to cause the controlled unit to increase the light output by a certain amount, decrease it by a certain amount or not to change anything. Indirect control signals carry miscellaneous data, such as commands that include parameters or the logical address of a unit next to be controlled, and may typically be represented by several bits of information.

Figure 2A:
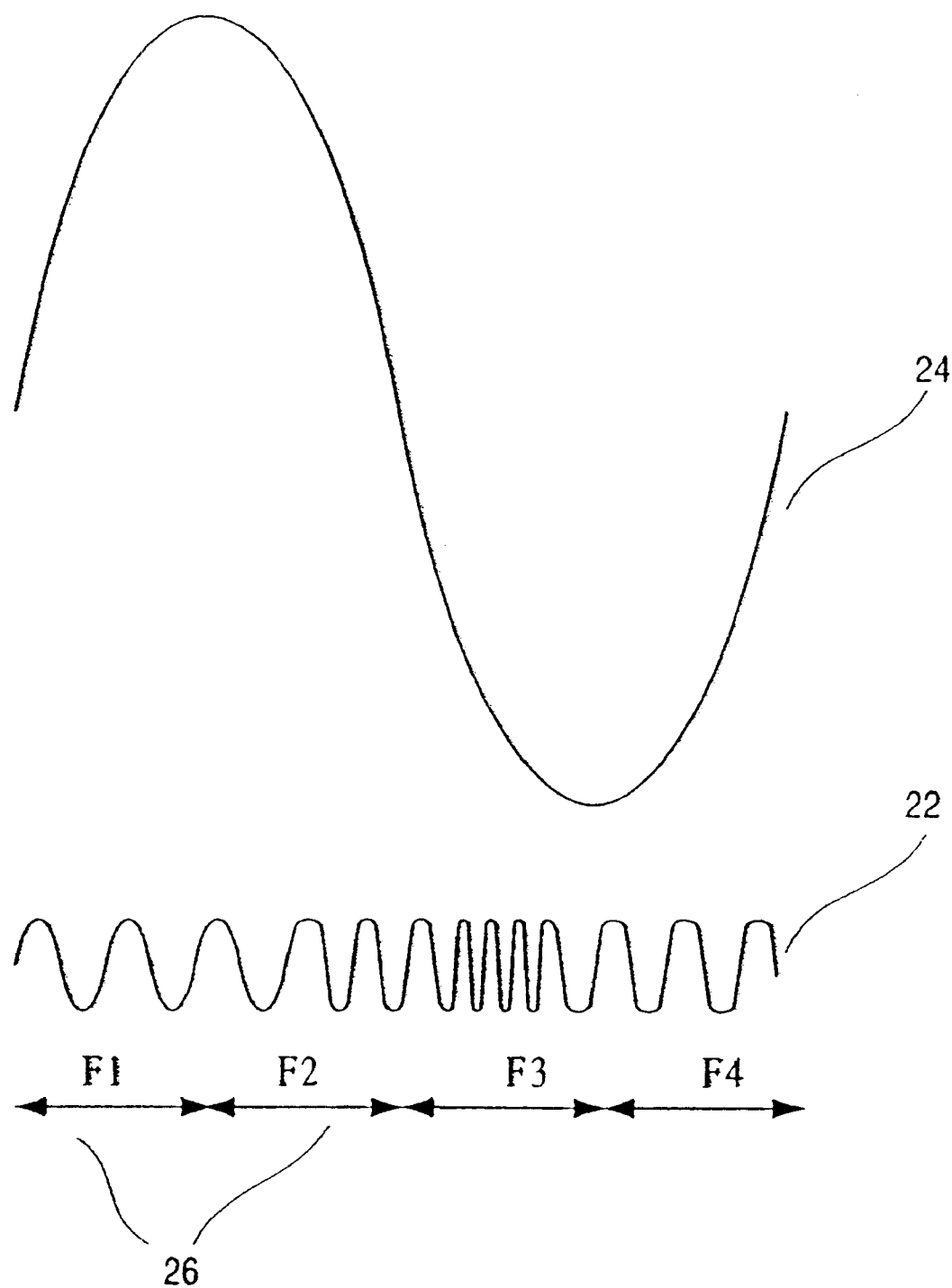
FIG. 2A illustrates the structure of an elementary transmitted signal according to the present invention.

FIG. 2A illustrates the structure of a typical signal being sent over a power line according to the present invention. It shows the signal 22 of a single symbol, which is the basic information-carrying unit, alongside one period of the power voltage 24. A symbol has a duration D. Preferably, D is equal to, or somewhat smaller than, the basic power voltage period (i.e. 1/60 sec. in the U.S.) or a simple fraction thereof. When D is equal to the power period, as in the case illustrated in FIG. 2A, 60 symbols are transmitted per second. The power voltage then conveniently serves for synchronization of the receiver to the symbols. In other systems, especially where the power is carried by direct current, synchronization may be effected by means of so-called flag signals, as will be explained herebelow. In general, there is a direct relationship between D and the noise immunity of the signal.

As seen in FIG. 2A, each symbol 22 consists of a series of N consecutive and equally long bursts 26 of alternating voltage; in the preferred embodiment N=4. The frequency of alternation within any burst, denoted in the figure for each burst 26 as F1, F2, etc., is selected from a group of M frequency values. These M values typically lie in the range between 20 and 150 KHz and are chosen so as to be orthogonal to each other; preferably they are also approximately equally spaced over a chosen range. As will be explained below, M is also the maximum number of possible symbol values, into which commands and data may be encoded, so that each symbol can, in effect, carry up to $\log_2 M$ bits of information. There is, however, an inverse relationship between M and the signal noise immunity. In the preferred embodiment, M=6. For each possible symbol value, a unique one of the M frequencies is assigned to each of the N bursts. Preferably, no two bursts, within any one symbol, share the same frequency. The table of FIG. 2B illustrates, by way of example, frequency assignments for the case of M=6 and N=4, the terms f1, . . . f6 representing the six possible frequencies.

It is noted that each burst could, by itself, convey the symbol value. However, the combination of N bursts enables conveying the value in the presence of frequent strong impulse-like disturbances; for example, if, in a 4-burst symbol, impulse disturbances occur during the first, third and fourth bursts, so as to prevent detection of their frequencies, the frequency of the second burst can still be detected and the corresponding symbol value—decoded. Moreover, in the case of stationary wide-band noise, the signal-to-noise ratio is clearly enhanced by the cumulative effect of the N bursts (in other words—by the expansion of one burst period by a factor of N).

It is further noted that, under the stated restriction of no repetition of a frequency within a symbol, interference by narrow-band frequency disturbances is also greatly overcome. This comes about because (as will be further explained hereunder), for each possible symbol, the received frequencies are correlation-decoded independently during each burst period and the correlation scores of the several periods are summed; the summary scores for the several possible symbols are mutually compared and the highest score indicates the detected symbol. The effect may be illustrated, for example, in a simple case of M=N=2: There would be two signal frequencies, f1 and f2, and two possible symbols—with sequences f1 f2 and f2 f1, respectively. Assume the transmission of a symbol of sequence f2 f1 and an interference having a frequency close to f1 and amplitude equal to that of the signal (i.e. S/N=1). During the first period, the first symbol correlator will correlate with the disturbance signal, while the second symbol correlator will correlate with the transmitted signal, the scores for the two symbols being then, for example, 1 and 1, respectively; during the second period only the second symbol correlator will correlate with a signal (namely the transmitted signal), so that the scores would then be 0 and 1. Summing the two period scores would yield overall symbol scores of 1 and 2, respectively, and thus the second symbol would be indicated as the detected one.

Figure 3A:
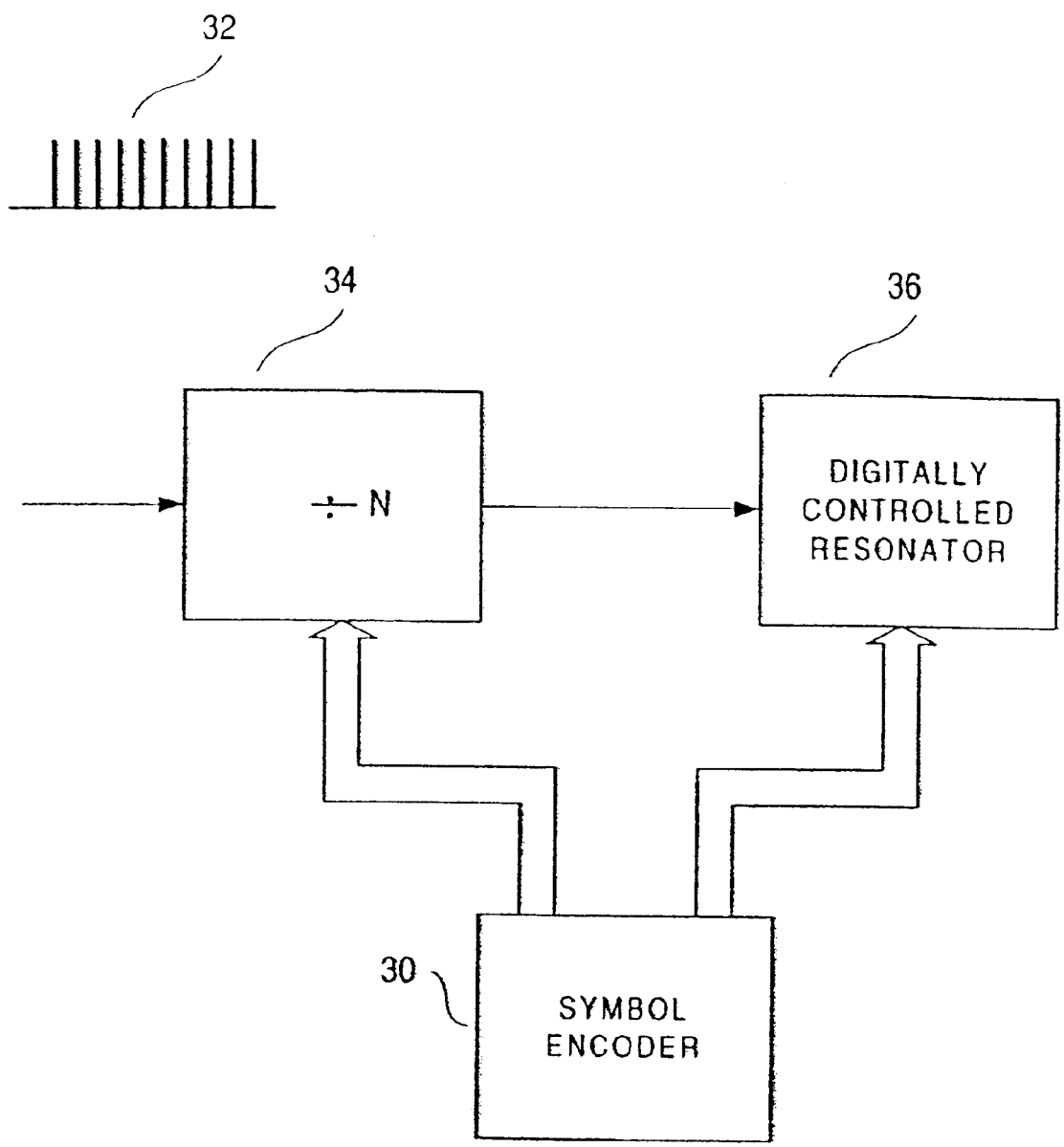
FIGS. 3A and 3B are schematic block diagrams of the transmitter according to a preferred embodiment and an alternative embodiment, respectively, of the present invention.

Encoding the signal for transmission can be carried out by any of a number of means known in the art, two of which are illustrated by the block diagrams of FIG. 3: FIG. 3A shows a preferred embodiment, wherein a high-frequency clock pulse train 32 is applied to a digital variable frequency divider 34. The divisor value is input to the divider, at the beginning of each signal burst period, from a symbol encoder 30. Frequency divider 34 preferably consists of an up-counter, which is set to the divisor value, then counts down the clock pulses; when the counter reaches zero, the output switches its binary state and the counter is set again to the divisor value, and so on. The output of the divider, being a square wave at the desired frequency, is applied to a digitally tunable resonator 36, which, in turn, outputs a sine-wave at the same frequency. Digital control signal is fed to resonator 36 from symbol encoder 30.

Figure 3B:
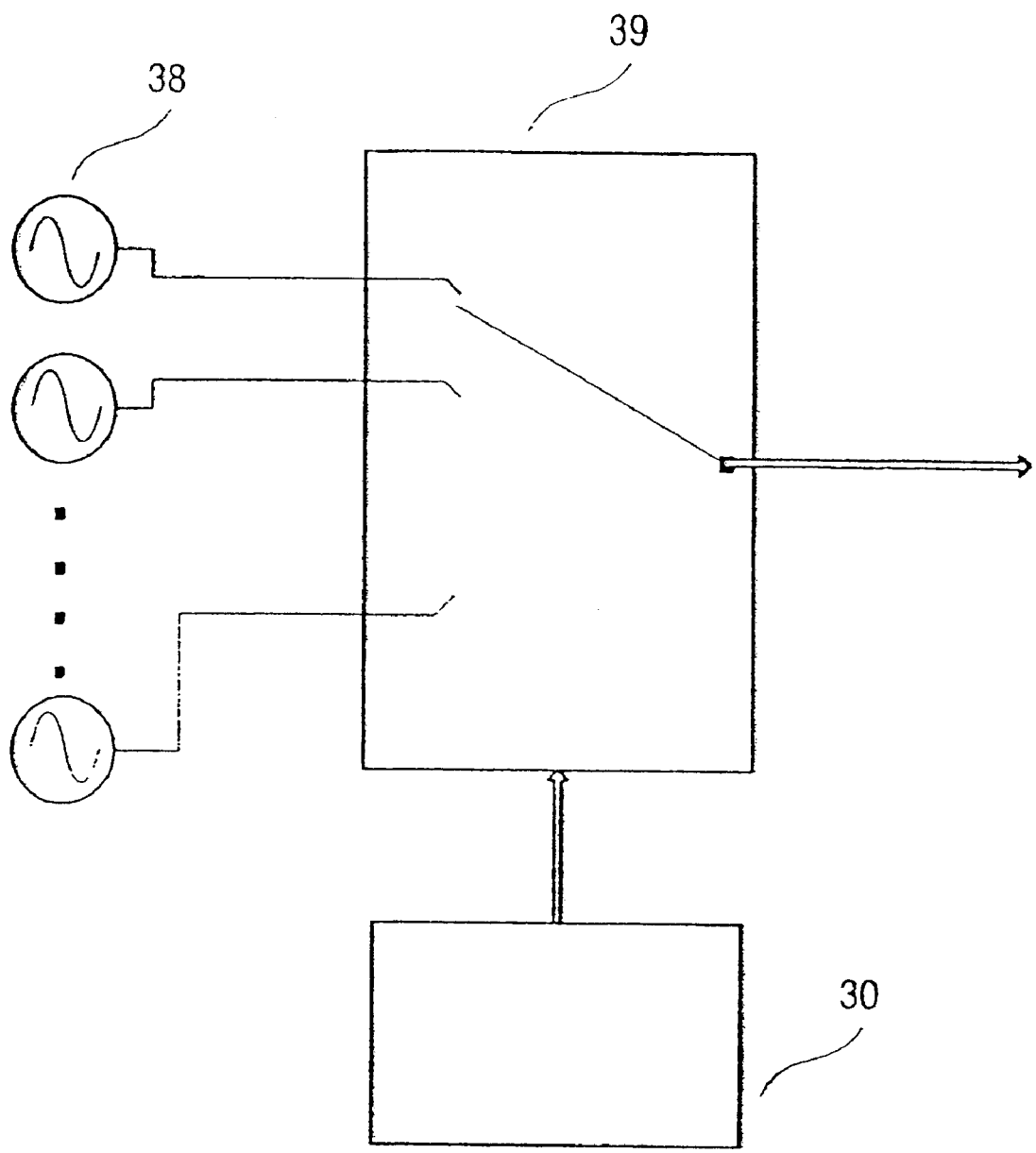

An alternative embodiment of the signal encoder in the transmitter is shown in FIG. 3B. There are M sine-wave generators 38, each generating a respective one of the M signaling frequencies. Each generator 38 may be implemented in a manner similar to that of FIG. 3A, except that the divisor for each divider and the resonant frequency of each resonator have fixed values. The output of each generator is fed to an analog selector switch circuit 39, which is digitally activated from symbol encoder 30, so that only a respective one of the frequencies is output during any one burst period.

Decoding of the received signal, that is, detection of the symbol values, is optimally done in the following manner, illustrated by the block diagram of FIG. 4A: The received signal first passes through a band-pass filter 41 that Just passes all $M_F$ frequencies, then applied to a bank of $M_F$ phase-insensitive synchronous detectors (or signal correlators) 40—each tuned to a respective one of the $M_F$ possible frequencies. Each synchronous detector 40 (to be further explained herebelow) outputs, at the end of each burst period, a signal that is the analog of the square of the average amplitude of the corresponding frequency in the received signal during that period. The $M_F$ outputs of synchronous detectors 40 are gated, at the end of each burst period, through a switching matrix 42, to a bank of $M_S$ integrators (or accumulators) 43—one for each possible symbol value. Switching matrix 42 is such that each integrator 43 receives, at the end of each burst period, the output of the detector that corresponds to the particular frequency assigned to its respective symbol value at that period. All squared amplitudes corresponding to any one symbol values are thus added together. Finally, at the end of a symbol period, the outputs of integrators 43 are gated out, through respective sample-and hold circuits 44, and mutually compared in a comparator circuit 45; the detected symbol value is determined to be the one corresponding to the largest of the $M_S$ accumulated output values.

Figure 4A:
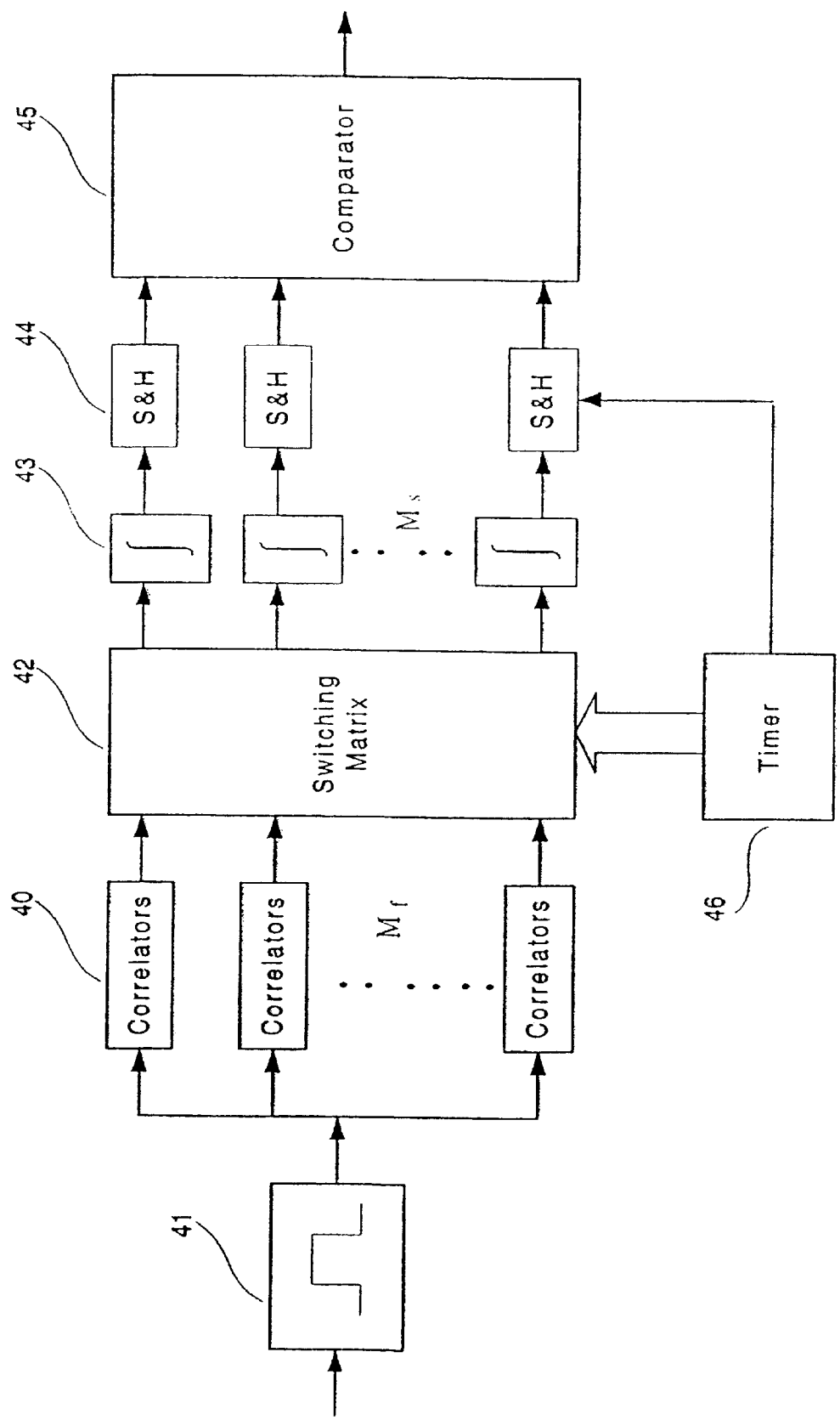
FIG. 4A is a schematic block diagram of a receiver according to one possible embodiment of the present invention, incorporating an optimal decoder.
Figure 4B:
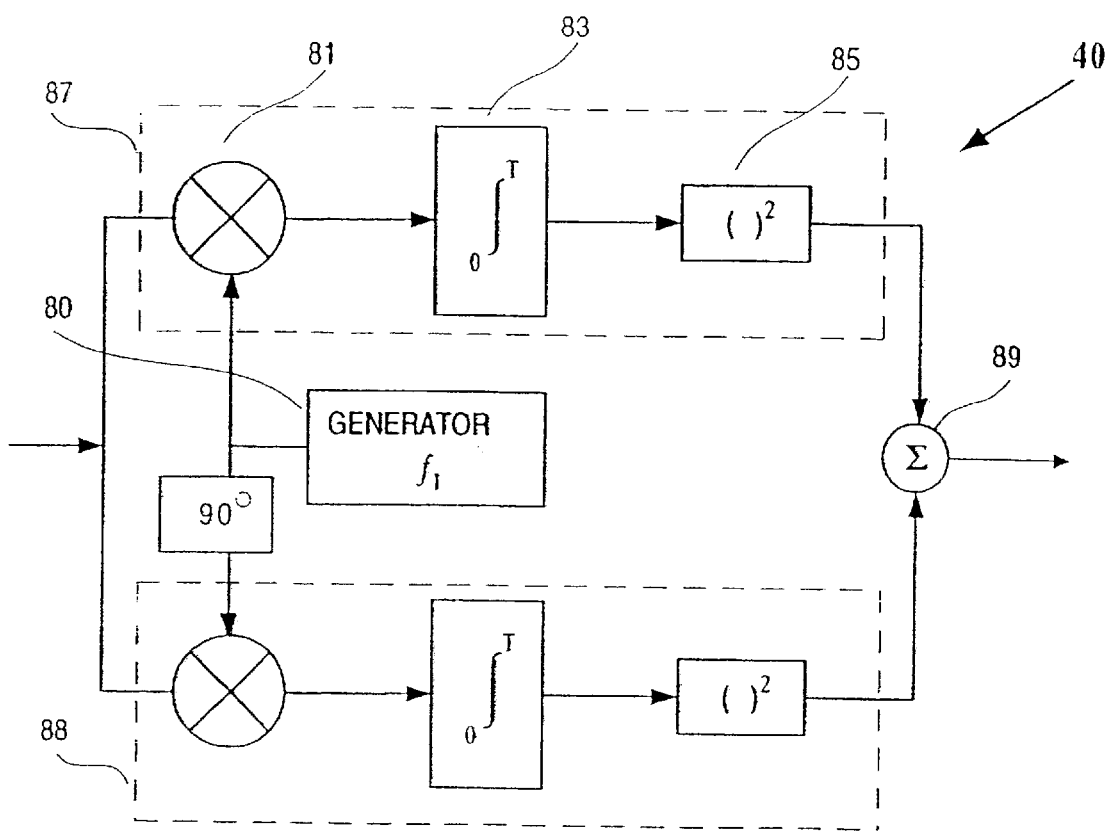
FIG. 4B is a detailed block diagram of a synchronous detector in the embodiment of FIG. 4A.

A typical synchronous detector 40 in the optimal preferred embodiment of FIG. 4A is shown, in greater detail, in FIG. 4B. It consists of a constant frequency generator 80, a pair of correlators 87 and 88, and summer 89. The two correlators are identical and each preferably includes, in tandem, a multiplier 81, an integrator 83 and a squarer 85. Constant frequency generator 80 generates a reference signal, whose frequency is identical to one of the $M_F$ frequencies used for encoding symbols, namely that frequency with which the particular synchronous detector is associated (i.e., to which it is tuned). This reference signal is applied, as one input, to multiplier 81 of each of the two correlators; it is applied directly to the multiplier of correlator 87 and after a quarter-wave phase shift—to the multiplier of correlator 88. Within each correlator, multiplier 81 multiplies the received (and filtered) signal by the applied reference signal. The product is applied to integrator 83, where it is integrated over the duration of one burst period, and thence to squarer 85. The outputs from squarers 85 of the two correlators are added together in summer 89, whose output, at the end of each burst period, thus represents the square of the average amplitude of the corresponding frequency in the received signal during that period. This signal is further processed as described hereabove.

In the preferred embodiment, a variation of the above-described optimal decoder is employed. This variation is not optimal, inasmuch as it is somewhat less immune to noise, but can be shown, and has been tested, to give satisfactory results under any practically occurring adverse conditions. On the other hand, it is particularly adapted to digital processing circuit components and thus enables building the detector, as well as the entire receiver, at very low cost.

Figure 5:
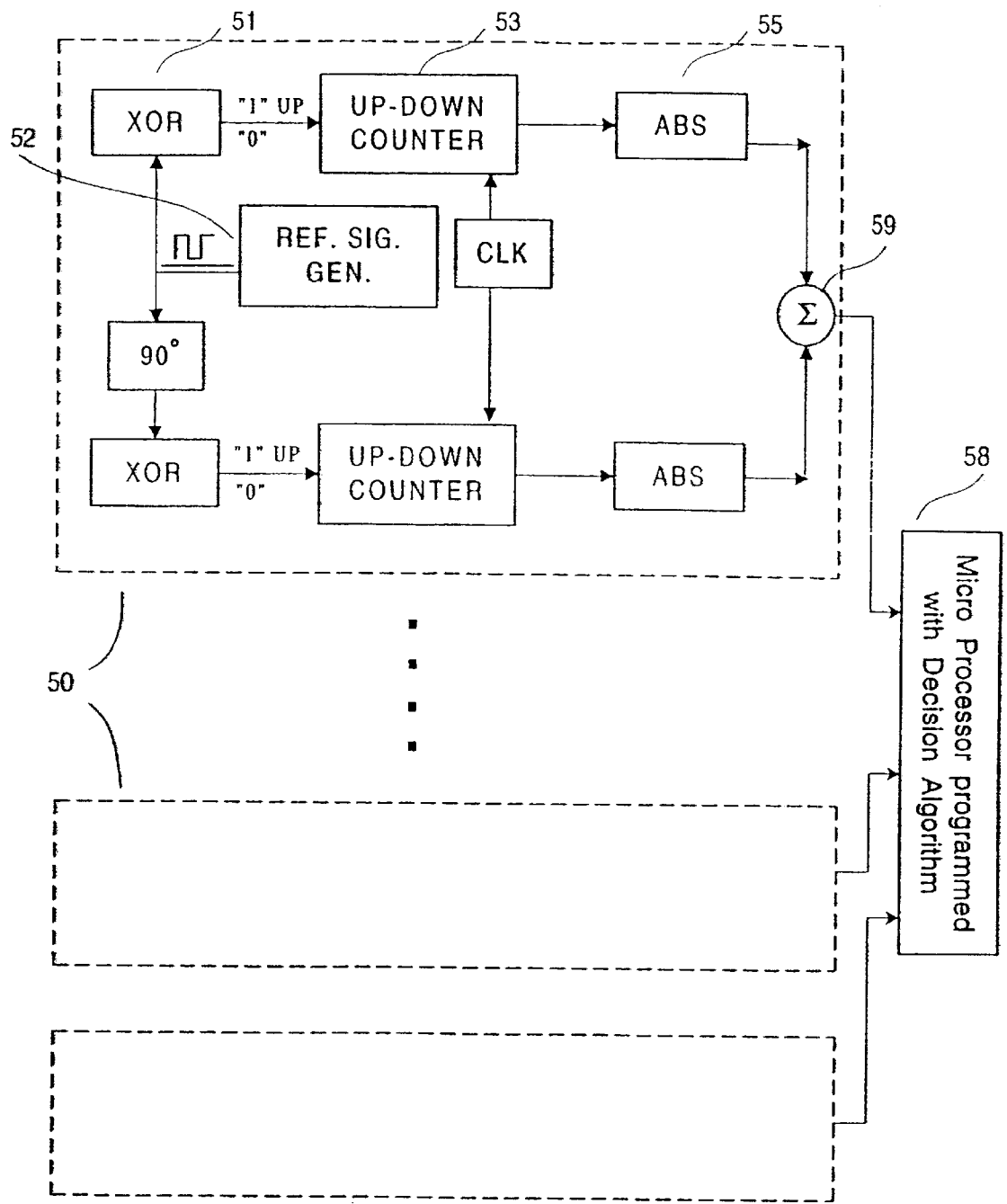
FIG. 5 is a schematic block diagram of the receiver according to a preferred embodiment of the present invention.

The preferred embodiment, shown schematically in FIG. 5, is based on a dual processor architecture, both processors being preferably configured on a single silicon chip, such as an application-specific integrated circuit (ASIC). One processor is a programmable general-purpose Micro-Processor (MP) 58 of conventional design, which is software- (or firmware-) programmed to carry out certain operations (to be explained herebelow). The other processor, is a gate array (GA), which is hardware-programmed to carry out specific logical functions, namely those of synchronous detectors 50 (also to be explained herebelow). With such an architecture, the fast and highly repetitious tasks, such as signal processing, take place in the Gate Array, which is a relatively simple, and therefore inexpensive, device, while the less frequently occurring (and generally more flexible) functions, including control of the GA, which are slower, are carried out by the Micro-Processor, which may be an inexpensive type. It is noted that such a scheme, which is a feature of the present invention, is advantageous, since it results in considerably lower overall cost than if all operations were carried out on a single fast enough processor.

Referring to FIG. 5, the received signal, after passing through a band-pass filter (as in the optimal detector, described hereabove and not shown in the figure) is converted, by a trigger circuit (or 1-bit A-D converter—not shown), to a binary signal. The latter is applied to a bank of $M_F$ digital phase-independent synchronous detectors 50—each tuned to a respective one of the $M_F$ possible frequencies and outputting, at the end of each burst period, a digital correlation value that is approximately analogous to the energy, in the corresponding frequency, of the received signal during that period. The outputs of the $M_F$ synchronous detectors 50 are fed, at the end of each burst period, to microprocessor 58. There they are processed, according to a decision algorithm (outlined herebelow), to yield, at the end of each symbol period, the detected symbol value. Groups of consecutive detected symbol values are then decoded—to yield the transmitted data, i.e. commands and control messages.

Each digital synchronous detector 50 preferably consists of a square-wave generator 52 and a pair of identical correlators, each including, in tandem, a XOR gate 51, an up-down counter 53, and an absolute-value device 55. Square-wave generator 52 generates, by means well known in the art (such as frequency division by settable clock pulse counters), a periodic binary reference signal whose frequency is identical to one of the $M_F$ frequencies used for encoding symbols, namely that frequency with which the particular synchronous detector is associated (i.e., to which it is tuned). This reference signal is applied, as one input, to XOR gate 51 of each of the two correlators; it is applied directly to the XOR gate of one correlator and after a quarter-wave phase shift—to the XOR gate of the other correlator. To the other input of each XOR gate 51 is applied the binarized input signal. The output of XOR gate 51 is high as long as, and to the extent that, both the (binary) received and reference signals are either in phase or at opposite phases. If the two signals are orthogonal (i.e. of different frequencies or, if of equal frequencies, at quadrature phase), the output oscillates about equally between high and low. It is noted that when the signals are at quadrature phase in one correlator, they are in phase or at opposite phases in the other correlator. Each counter 53 is reset to zero at the beginning of each burst period. The counter then counts clock pulses, fed thereto, as gated by the output of the respective XOR gate: As long as the output is high, the counter counts up and as long as the output is low, it counts down. The counter thus functions as a digital integrator, operating on the output of the XOR gate. At the end of the burst period, the count in counter 53 of each correlator is output and fed to absolute-value device 55. The outputs of the two absolute-value devices 55 are added together in adder 59, and the resultant sum is fed to MP 58.

It will be readily understood that, within any correlator, if the received signal is orthogonal to the reference signal, the contents of the counter will oscillate about zero and, at the end of the burst period, will remain close to zero. On the other hand, if the two signals are of the same frequency, the counter's contents, at the end of the burst period, will be generally non zero and proportional to the phase between them. The absolute value of the counter's contents, obtained from absolute-value devices 55, can therefore be regarded as a partial correlation value. It will also be readily understood that, since the reference signals fed to the two correlators of any one detector 50 are in phase quadrature, the respective partial correlation values, yielded by the two correlators, are complementary and that therefore their sum, as indeed obtained from adder 59, approximately represents the full correlation value of the received signal with the respective reference frequency, regardless of their phase relationship. It is noted that thus each detector 50 functions as a phase-insensitive synchronous detector, tuned to its respective frequency. Phase insensitivity is advantageous in power-line communication systems, since (a) it obviates the need for either transmitting or generating a synchronous reference signal, which may be expensive if errors due to noise are to be avoided, and (b) the phases of the bursts themselves are subject to significant perturbations, due to noise.

The MP is programmed to carry out the decision algorithm, which, in effect, calls for the following operations, in sequence:

(1) at the end of each burst period, obtain from the output of each of the $M_F$ synchronous detectors 50 the sum in adder 59, which is stored as the correlation value of the signal with the corresponding reference frequency.
(2) at the end of each symbol period, i.e. after each N burst periods (at which time the scores for all $M_F$ frequencies at all N bursts are stored), obtain, for each of the $M_S$ possible symbol values, the correlation value for the corresponding frequency at each burst period (the correspondence being stored as an $M_S$xN code matrix) and add the N correlation values together, to yield a symbol score.
(3) Compare all $M_S$ symbol scores and output the symbol value corresponding to the highest symbol score.

It will be appreciated that, when differently embodying the present invention, the logical operations, described above as carried out in the MP, may also be carried out by any special-purpose processor or also within the GA.

According to an alternative configuration of the present invention, applicable if the phase of the received signal were constant and predictable and thus no phase insensitivity were necessary, each synchronous detector consists of a single processing chain (rather than a pair, as described above). The reference frequency, being now supplied in a single phase, is phase-synchronized to the corresponding frequency at the encoder in the transmitter.

The timing of the detector circuits, with respect to the burst- and symbol periods, is effected by a timing circuit, which is preferably synchronized to the power line frequency. Such synchronization is effected by means well known in the art, for example—by setting or resetting appropriate clock-pulse counters upon a trigger produced from a zero-crossing of the power voltage. Alternatively, synchronization can be achieved by periodically sending a unique signal, called flag, for example—a particular combination of frequencies, sent simultaneously or spread over a symbol period; at the end of such a signal, all timing counters, which otherwise run free, are reset.

Preferably, the burst frequencies themselves, as generated in the transmitter, and the corresponding reference frequencies in the receiver are mutually synchronized. Such synchronization has the important advantage of narrowing the required bandwidth of the receiver, around each burst frequency, since it thus does not need to anticipate random frequency variations that are inherent to independent frequency generators. The narrower bandwidth, in turn, causes an increase in signal to noise ratio or could, alternatively, be utilized to employ a greater number of burst frequencies employable within a given overall band, and thus, for example, increase the number of available symbol values. Furthermore, the practical implementation of a synchronous signal generator, as is described herebelow, obviates the need for the use of a crystal-controlled oscillator, as is required in an independent signal generator in order to maintain sufficient frequency stability, and thus reduces hardware costs. A further advantage of the synchronization of frequency generators is that the alternative receiver configuration, mentioned hereabove, wherein only one correlation path (rather than two) is employed in each synchronous detector 50 (FIG. 5), becomes practical, since the phase relationship between each received burst frequency and the corresponding reference frequency may now be practically constant.

Synchronization between the transmitted frequencies and the corresponding receiver reference frequencies is usually achieved by comparing them to a common reference frequency. In a PLC system such a reference frequency is readily available, namely the power line frequency, which is indeed preferably used, as in the implementation describes herebelow. However, also any other frequency could be generated and broadcast over the system as a pilot signal, to serve as reference for synchronization.

Synchronous frequency generators are well known in the art. One prevalent configuration of such a generator, as preferably employed in conjunction with the present invention both in a transmitter and in a receiver, is schematically shown and collectively identified by numeral '99 in FIG. 8. It consists mainly of a reference signal conditioner (RSC) 90 and a phase-locked loop (PLL) 91. The reference frequency signal is fed from RSC 90 to PLL 91 and the latter generates a master signal, of a relatively high frequency that is an exact multiple, N, of the reference frequency and bears a constant phase relationship thereto. If, for example, the power frequency is 60 Hz and the required frequency of the master signal is 900 Khz, then N=15,000. The master signal is subsequently applied to one or more frequency dividers 98, which supply the desired burst- or detection reference frequencies.

In the preferred embodiment, RSC 90 is fed (through a transformer or a resistive attenuator—not shown) a fraction of the power line voltage, which is applied through a low-pass filter (LPF) 92 to a squaring and digitizing circuit 93. The latter outputs a square-wave (i.e. binary signal) at the levels acceptable to digital circuits and at the power line frequency, which is the reference frequency. In the case of an independently broadcast reference signal at a frequency much higher than that of the power line, LPF 92 would be replaced by a very narrow band-pass filter and amplifier.

Figure 8:
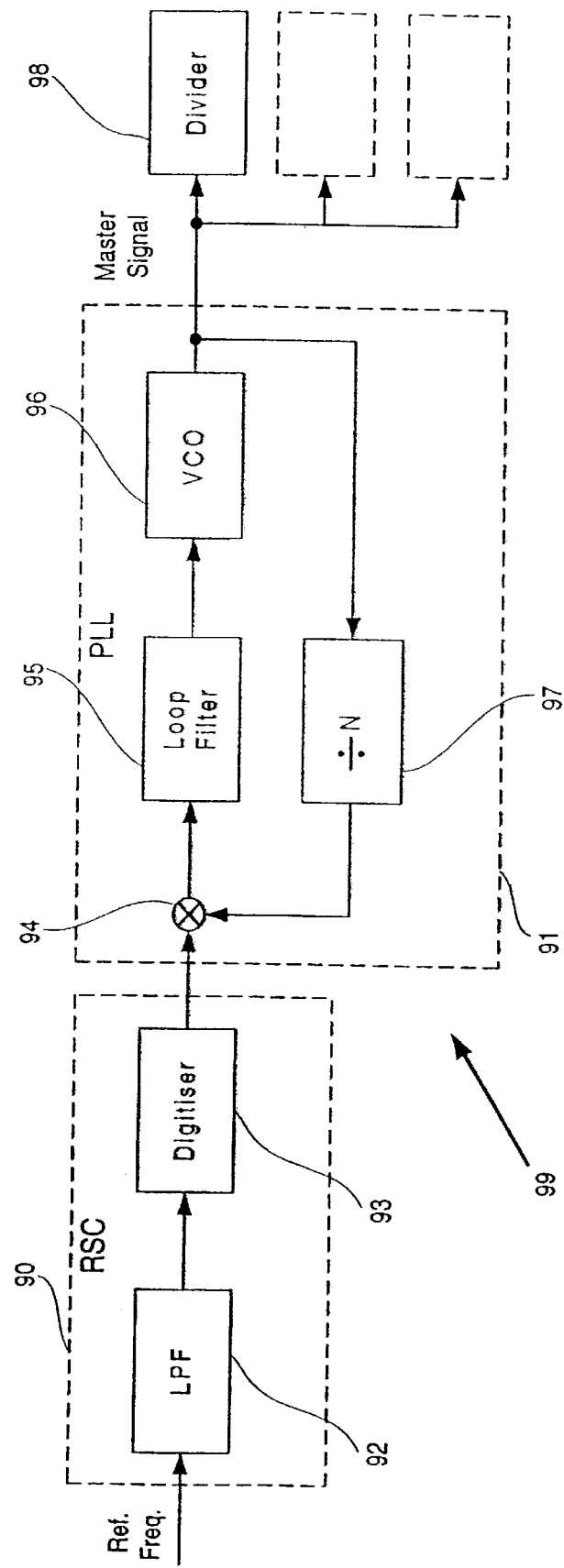
FIG. 8 is a schematic block diagram of a frequency synchronizing circuit employable in conjunction with the transmitters of FIG. 3 and the receiver of FIG. 5.

PLL 91 usually consists of a voltage-controlled oscillator (VCO) 96, which outputs the master signal, a frequency divider 97, a signal comparator 94 and a loop filter 95, all connected in a closed loop, as shown in FIG. 8. The master signal is applied to frequency divider 97, which divides its frequency by N, thus nominally producing a signal with a frequency equal to that of the power line. Its output is applied to comparator 94, together with the reference signal from RSC 90. The output of comparator 94 contains a signal that is the difference between the two applied signals and this is fed, through loop filter 95 to the control input of VCO 96. If the output of divider 97 and the reference signal have exactly the same frequency and if, furthermore, they are exactly at opposing phases, which is the desired operating condition, the corresponding difference signal is zero and no correction signal is applied to the VCO. To the extent that the relative phases deviate from exact opposition, there is a corresponding near dc component in the output of the comparator and a corresponding correction signal is fed from loop filter 95 to VCO 96, causing the latter to slightly change its output frequency until the operating condition is again reached.

A synchronous frequency generator such as 99 described hereabove with reference to FIG. 8, may be utilized in the transmitter of FIG. 3A or of FIG. 3B. In the transmitter of FIG. 3A the input signal (or pulse train) 32 is obtained from the master signal output by VCO 96 and the settable divider 34 is identified with one divider 98 of FIG. 8. In the transmitter of FIG. 3B frequency generators 38 are replaced by corresponding frequency dividers 98 (FIG. 8) which are fed by the master signal. A synchronous frequency generator may be similarly utilized in the receiver represented by FIG. 5, whereby, in each synchronous detector 50, reference signal generator 52 is replaced by a corresponding frequency divider 98 (FIG. 8), which is fed by the master signal and divides its frequency down to the appropriate reference frequency. Preferably, synchronous frequency generator 99, or at least portions thereof, such as PLL 91 and dividers 98, are implemented as a part of the GA on which also the other receiver circuits are implemented, thereby further reducing costs. It is noted that this is another feature of the present invention. Both processors—the GA and the MP—preferably serve also other functions in the system, thus further reducing overall costs. In the context of a digital lighting control system, such as outlined in FIG. 6, such functions may include, for example, ballast control and/or power factor correction, which are respectively described in U.S. Pat. No. 6,043,633 and PCT Application No. WO00/35252. In the preferred embodiment, separate portions of the GA are assigned to the various functions, while the MP is programmed to carry out its tasks for the various functions on a time-sharing basis. It will be appreciated that similar schemes may also be possible in other control systems. The application of the power-line communication method of the present invention to a lighting control system will now be briefly described, by way of example, with reference to FIG. 6.

Figure 6:
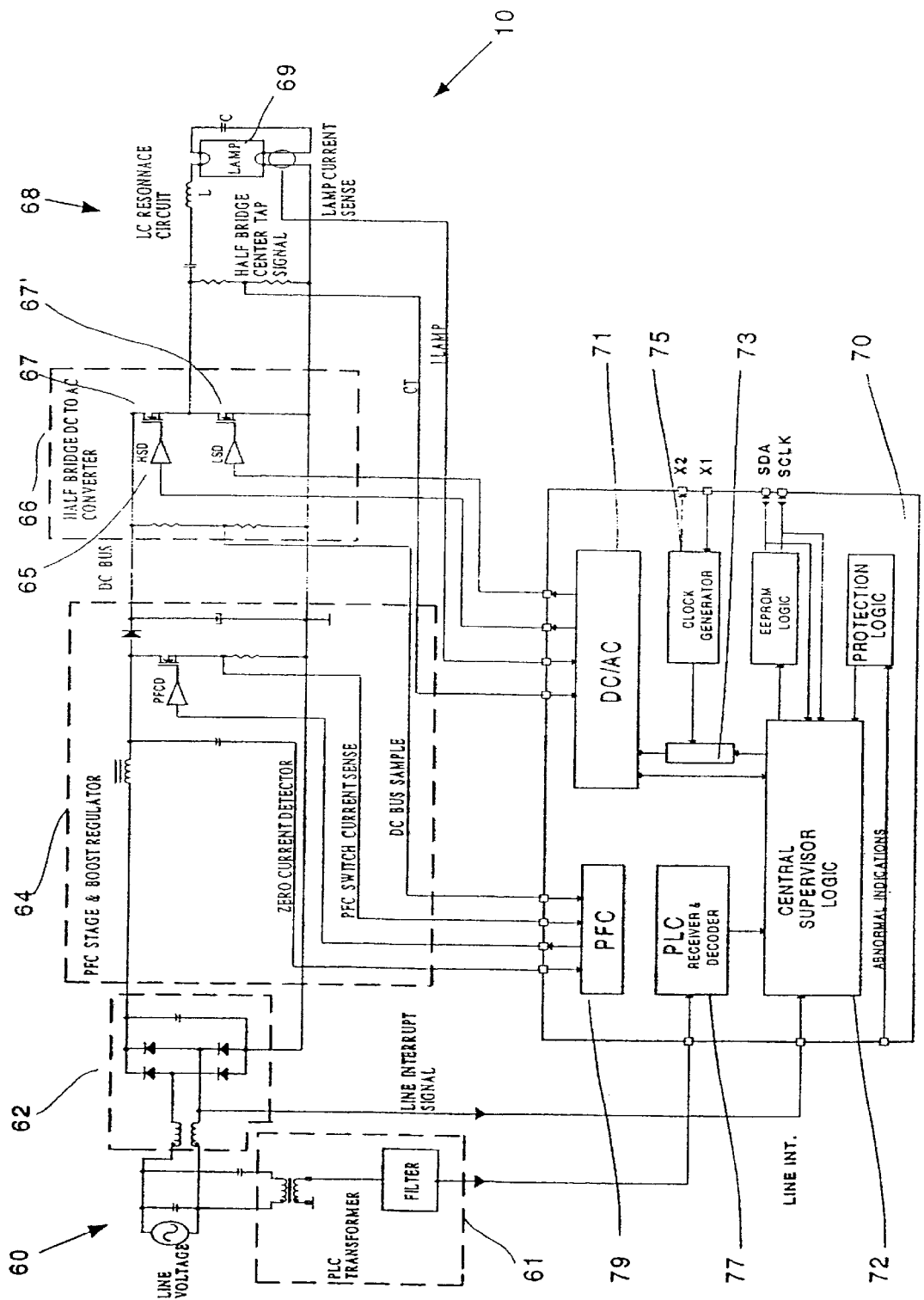
FIG. 6 is a schematic diagram of a digital light controller incorporating the receiver of FIG. 5.

FIG. 6 shows schematically a typical configuration of ballast/controller 10 (FIG. 1) with one lamp and with PLC capability. There is shown a power input circuit 60, feeding alternating current to full-wave rectifier 62. The latter supplies direct voltage, through power factor correction (PFC) circuit 64, to a half-bridge DC-to-AC converter 66. The latter serves as a controlled high-frequency current source for the lamp circuit 68. Lamp circuit 68 consists primarily of an L-C series-resonant circuit, connected in series with fluorescent lamp 69. During normal operation, the plasma in lamp 69 completes the circuit between the two filaments of the lamp; During priming (start-up) the circuit is completed through a capacitor, serially connected between the two filaments. DC-to-AC converter 66 consists primarily of a pair of MOSFET switches—an upper switch 67 and a lower switch 67'. The two switches are gated by pulses, which are timed so that only one switch at a time is closed (i.e. conducting). When upper switch 67 is closed (i.e. on), DC voltage is applied to resonant circuit 68, causing a positive half-cycle of current to flow therethrough. When lower switch 67' is closed, it shorts out circuit 68, causing a negative half-cycle of current to flow therethrough. Thus an alternating current flows through lamp 69, causing its plasma to glow and to stimulate its phosphor coating to emit light.

The timing of the pulses driving switches 67 and 67', that is their frequency and durations, must be very carefully controlled so as to keep the phase of the current through circuit 68 just lagging the phase of the applied voltage and so as to control the amplitude of the current to produce a desired light level. This control is achieved in the illustrated system by generating the pulses digitally and feeding them to the switches via amplifiers 65. The pulses are generated in a pulse synthesizer 73 and fed to amplifiers 65 through a converter 71. Pulse synthesizer 73 operates on clock pulses from clock generator 75 according to timing data supplied from a central supervisor logic 72. Central supervisor logic 72 continuously calculates pulse timing parameters on the basis of, inter alia, voltage values from circuits 66 and 68, fed to it through converter 71. Central supervisor logic 72, pulse synthesizer 73, clock generator 75 and converter 71 are all implemented as respective portions of a Gate-Array (GA) integrated circuit 70.

Another portion of GA 70 is formed as PFC controller 79, which serves to control PFC circuit 64. PFC circuit 64 serves to correct the varying current phase angle reflected from DC-to-AC converter 66, through rectifier 62, back to the mains power circuit 60.

Yet another portion of GA 70 is formed as PLC receiver and decoder 77, which serves to input to central supervisor logic 72 control commands, transmitted over the power lines. Such commands include light level control commands, which are translated by logic 72 into pulse timing parameters. PLC receiver 77 receives encoded message signals from the main power line circuit 60 through coupling circuit 61. The latter consists of a transformer and a high-pass filter. PLC receiver 77 is preferably as shown in some detail in FIG. 5 and functions as described hereabove.

It is noted, as a feature of the present invention, that by implementing the various digital units described above, all of which are required to operate at relatively high speeds, as portions of a single application-specific integrated circuit (ASIC) chip, namely GA 70, much economy is achieved. The economy is due to (a) the very implementation in an ASIC (rather than a general-purpose processor), (b) the design and fabrication of a single chip (rather than multiple chips) and (c) the built-in interconnections (rather than via a circuit board). Some of these units also communicate with a micro-processor (MP—not shown), which is of the general purpose type and serves to perform slower data processing and control functions. Such a cooperation between the GA and the MP, which is another feature of the present invention, is described hereabove with respect to the PLC operation.

As mentioned hereabove, control messages (sent from a control panel or from a sensor to the lighting controllers, such as controller 10 in FIGS. 1 and 6) may be of two types—(a) direct commands and (b) data strings. A direct command is encoded into a single symbol, by assigning a unique symbol value to each command value. Two direct command values are reserved for controlling the communication system itself. One such command value is "idle" message; it is always sent in the absence of any command or data, in order to indicate to the receiver that the communication system is active and to present the decoder with a positive choice; (otherwise, in the absence of a transmitted signal, the decoder would attempt to decode received noises, resulting in errors). The other reserved command is "begin string", which serves to indicate the beginning of a data string. Thus, if M is the number of available frequencies (denoted above by $M_F$), a maximum of M−2 direct commands for other control functions may be encoded. In the exemplary lighting system, only two such direct commands are actually defined, namely "increase" and "decrease", whose effect is, respectively, to raise or lower the light level by a predefined amount. It is noted that certain direct command values may also be reserved for a "flag" function, which may periodically serve to synchronize decoder timing to transmitted burst- and symbol times; this may be important in communication systems that cannot rely on the power frequency for synchronization. It is recalled that a symbol is transmitted as a series of N bursts (each in a uniquely assigned frequency)—preferably over one power period; a direct command is thus transmitted in a single power period.

A data string begins with a "begin string" symbol and consists of S consecutive symbols. In general, up to $\log_2 M$ message bits can be encoded onto each symbol in the string. If, for example, M=4, each symbol will carry two bits and the whole string may carry 2S bits. If M=8, the string may carry 3S bits. If M is a non-integral power of 2, groups of two or more consecutive symbols are preferably encoded together. For example, if M=6, each pair of symbols may have up to 36 ($=6^2$) values, into 32 of which five message bits may be encoded; a string of S symbols would then carry (5/2)S message bits.

To more concretely illustrate the scheme, for a system with M=6, let us name the six possible values of each symbol by A, B, C, D, E and F, respectively and assume that the communication system should carry data as a 10-bit number, at a time (which could, for example, specify a particular light level, out of 1024 levels). Then for each number, 10 bits worth of information need to be transmitted. These would be carried by a string of four symbols, logically grouped as two consecutive pairs, each pair carrying a corresponding byte of five bits. The five bits are encoded onto the pair of symbols through a lookup table, whose first three and last three entries may, for example, be:

| address | entry |
|---------|-------|
| 00000 | AA |
| 00001 | AB |
| 00010 | AC |
| ... | ... |
| 11101 | EF |
| 11110 | FA |
| 11111 | FB |

Figure 7:
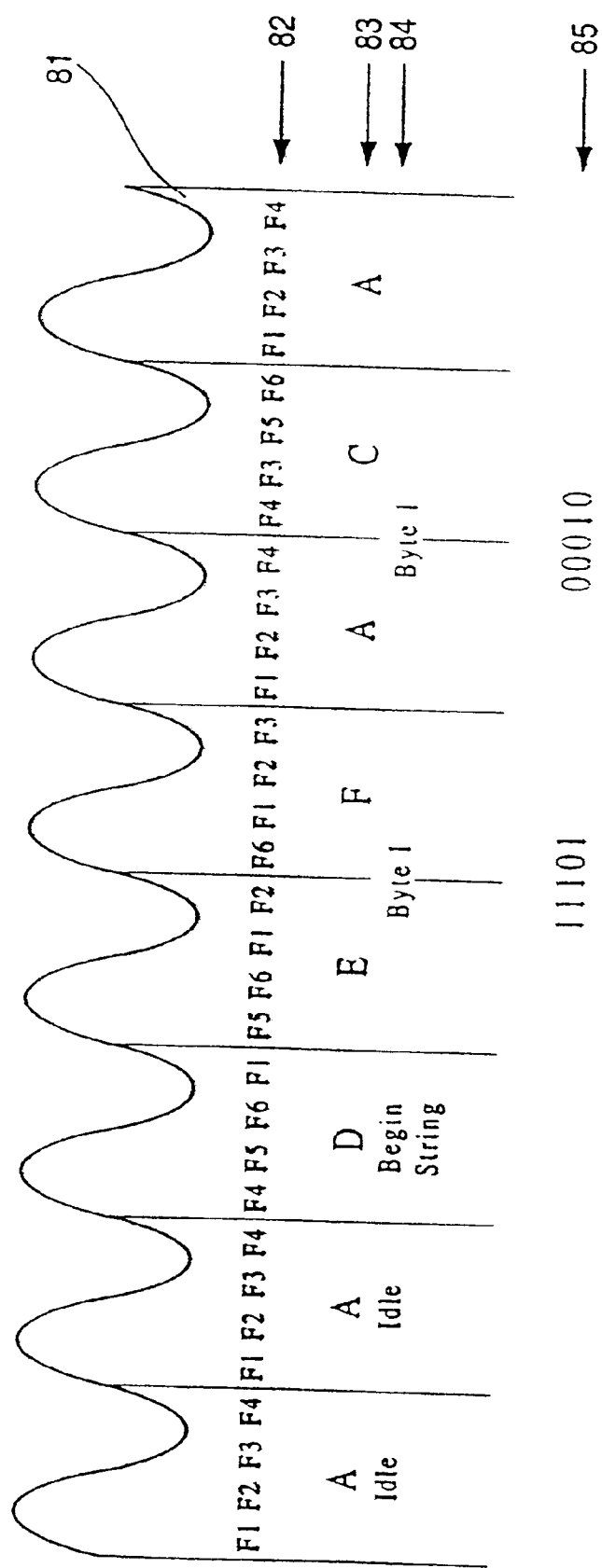
FIG. 7 illustrates the structure of an exemplary transmitted signal that carries data.

The four-symbol string is, of course, preceded by one communication command, with the value "begin string" (which may consist of, say, symbol D), which, in turn, is usually preceded by an indefinitely long string of "idle" commands (say, symbol A). This scheme is illustrated, by way of example, in FIG. 7, which shows aligned in time— (a) several cycles of the power line voltages 81, (b) designations of burst frequencies 82 (four per cycle), (c) designations of symbol values 83 (one per cycle), (d) commands and byte designations 84 and (e) the carried number as bits 85. In this particular example, the illustrated portion of time begins with two "Idle" commands, then proceeds with a "begin string" command, which is followed by a string of four symbols, carrying a 10-bit number, and ends with an "Idle" command. Note that one of the "A" symbols is interpreted as part of a byte (rather than "Idle" command) because it is within a string (indicated by the preceding "D" symbol) of predefined length. Note also that the last shown symbol could be a "D" (rather than "A"), in which case it would indicate the beginning of another string of four symbols (carrying another number); in fact, a consecutive series of such 5-symbol groups (each—a "D" and a four-symbols string) is possible.

It is noted, and has been empirically proven by the inventors, that the multi-frequency channel encoding scheme of the present invention, as described hereabove, is particularly robust in face of the various noises and disturbances prevalent on the power lines of typical lighting systems. It would therefore normally be unnecessary to provide either error correction codes or error detection codes coupled with a return transmission path for requesting retransmission (as is customary in many conventional digital communication systems, including some power line communication systems). It may further be noted that in lighting systems, an erroneously received message usually does not cause any drastic failures, but rather an incorrect response—which would be immediately correctable by the agency that issued the command (either a person or a feedback controller).

If, however, utmost transmission reliability is paramount, a self-correcting encoding-decoding scheme may still be used in conjunction with the method of the present invention. One simple scheme is, for example, to append each byte of data with a checksum bit and to transmit the thus augmented byte twice; upon reception, the byte with the true checksum (which usually would be any of the two identical bytes) is accepted as carrying the correct information. As a particular example, for the case of M=6, consider sending information data as bytes of nine bits each; according to the present scheme, each byte would be augmented with a checksum bit, to form a ten-bit byte, which, in turn, is encoded into two pairs of symbols; the two pairs are transmitted twice (say, successively)—for a total sequence of eight symbols. Decoding is then done in a reverse order—to obtain the correct 9-bit data.

It will be appreciated that other, possibly more efficient, error correction schemes may also be used, still coming within the scope of the present invention. It is noted, though, that any such scheme must contend with possibly correcting all bits carried in common by a group of symbols (e.g., 5 bits carried by two symbols, as in the example hereabove) upon the corruption of any one symbol.

In a control system, such as the lighting control system described hereabove, the data thus transmitted over strings of symbols may variably be any data of internal meaning for the system. It could, for example, be an address of a controlled device (e.g. a cluster of lamps), a new value of current level to be reached or maintained, or some other parameter. It will be appreciated that the present invention is applicable to any power line transmission system and is independent of the nature of the data and its meaning to the system. It is noted, though, that the present invention is particularly advantageous for power control systems, in which required data transmission rates are typically measured in tens, or, at most, in hundreds, of bits per second, but where reliability, in face of a high level of interfering noise of various kinds, without a feedback path and at minimal cost, is paramount.

More generally, while the invention has been described with respect to a limited number of embodiments, it will be appreciated that many variations, modifications and other applications of the invention may be made.

What is claimed is:

1. A method for transmitting data over power lines, the data being represented by a series of symbols, each symbol having one of a finite number of possible values, the method comprising:

encoding the series of symbols into a corresponding sequence of groups, each group consisting of N successive bursts of alternating signal, whereby each burst is assigned one of M possible frequencies; and decoding a group of said successive bursts, upon reception, whereby the decoding includes:

providing M reference signals, each having a unique one of said M frequencies, and correlating each of said bursts with said M reference signals, resulting in M correlation values for each burst, for each possible symbol value, selecting for each burst the correlation value that corresponds to the frequency assigned to that symbol value and adding all selected correlation values together, to yield a symbol score, and selecting the highest symbol score to indicate the decoded symbol value;

whereby said correlation, with respect to each of said M reference signals, includes:

providing the reference signal as a binary values reference signal;

converting the received signal into a binary valued received signal;

performning a XOR operation between the binary valued reference signal and the binary received signal;

providing a continuous train of clock pulses; and counting said clock pulses up or down according to the results of said XOR operation.

2. The method of claim 1, whereby no two of said bursts in any one of said groups are assigned the same frequency.

3. The method of claim 1, whereby there is unique correspondence between the value of any symbol and the frequency of any one of said bursts within the corresponding group.

4. The method of claim 1, whereby said correlation values are insensitive to the phase between the recieved burst and the corresponding reference signals.

5. The method of claim 1, wherein the power in the power lines is carried as an alternating current at a power frequency, whereby said groups are timed in synchronism with the power frequency or any of its harmonics.

6. The method of claim 1, wherein the power in the power lines is carried as an alternating current at a power frequency, whereby said M frequencies are synchronized with the power frequency.

7. The method of claim 1 whereby all of said reference signals and the frequencies of all of said bursts are synchronized to a common reference frequency.

8. Apparatus for decoding a signal received over a power line, the signal having been transmitted as a sequence of groups, each group encoding a data-carrying symbol, having one of a finite number of possible values, and consisting of N successive bursts of alternating signal, whereby each burst has been assigned one of M possible frequencies, the apparatus comprising:

at least one signal generator operative to produce a reference signal for each of the M frequencies;

at least one correlator for each of the M frequencies, operative to correlate the received signal with a corresponding reference signal, and to thus yield a correlation value at the end of each burst;

an adder for each possible symbol value, operative to add corresponding correlation values from a plurality of correlators, obtained at a plurality of bursts, and to thus yield a symbol score;

a selection logic, operative to select from among the outputs of said adders the one with the highest symbol score;

a circuit to convert the received signal into a binary received signal; and a clock pulses generator;

and wherein:

said at least one reference signal generator is operative to generate a binary reference signal; and said at least one correlator includes:

a XOR gate, receptive to said binary received signal and a binary reference signal, and an up-down counter, operative to count pulses, obtained from said clock pulses generator, up or down according to the output of said XOR gate.

9. The apparatus of claim 8, wherein:

said at least one reference signal generator is operative to generate a pair of reference signals, which are in mutual phase quadrature; and said at least one correlator includes:

a pair of correlators, each operative to correlate the received signal with a respective one of a corresponding pair of reference signals in mutual phase quadrature, to yield a respective pair of component correlation values; and an adder, operative to add the absolute values of the two component correlation values, to yield said correlation value.

10. The apparatus of claim 8, further comprising a gate array and wherein said at least one correlator is part of said gate array.

11. The apparatus of claim 10, wherein said gate array is part of a lighting controller.

12. The apparatus of claim 10, wherein said gate array is part of a power controller.

13. The apparatus of claim 8, wherein the frequency of each of said reference signals is synchronous with the respective one of the assigned M frequencies.

14. The apparatus of claim 13, whereby the power line carries power as an alternating current at a power frequency, wherein the frequency of each of said reference signals is synchronous with the power frequency.

15. The apparatus of claim 13 further comprising a phase-locked loop.

16. The apparatus of claim 10, further comprising a phase-locked loop.

17. The apparatus of claim 16, wherein said phase-locked loop is a part of said gate array.

18. A lighting control system, for controlling lamps by means of signals transmitted over a power line, the signals carrying encoded control commends, the system comprising:

at least one encoder, operative to encode control commands as a sequence of symbols, each symbol having one of a finite number of possible values, and to encode each symbol into a corresponding group of N successive bursts of alternating signal, whereby each burst is assigned one of M possible frequencies; and at least one decoder, which includes:
- at least one reference signal generator, operative to generate a reference signal for each of said M frequencies,
- at least one correlator for each of said M frequencies, operative to correlate the received signal with a corresponding reference signal, and to thus yield a correlation value at the end of each burst,
- an adder for each possible symbol value, operative to add corresponding correlation values from a plurality of correlators, obtained over a plurality of bursts, and to thus yield a symbol score,
- a selection logic, operative to select the highest symbol score,
- a circuit to convert the received signal into a binary received signal, and
- a clock pulses generator;

and wherein:
said at least one reference signal generator is operative to generate a binary reference signal; and
said at least one correlator includes;
- a XOR gate, receptive to said binary received signal and a binary reference signal, and
- an up-down counter, operative to count pulses, obtained from said clock pulses generator, up or down according to the output of said XOR gate.

19. The system of claim 18, wherein:
said at least one reference signal generator is operative to generate a pair of reference signals, which are in mutual phase quadrature; and
said at least one correlator includes:
- a pair of correlators, each operative to correlate the received signal with a respective one of a corresponding pair of reference signals in mutual phase quadrature, to yield a respective pair of component correlation values; and
- an adder, operative to add the absolute values of the two component correlation values, to yield said correlation value.

20. The system of claim 18 wherein said at least one decoder further includes a gate array and wherein said at least one correlator is part of said gate array.

21. The system of claim 18, wherein the frequencies of all of said bursts and of all of said reference signals are synchronous with a common reference frequency.

22. The system of claim 21, whereby the power line carries power as an alternating current at a power frequency, wherein said common reference frequency is the power frequency.

23. The system of claim 18 wherein said at least one encoder and said at least one decoder each further comprises a phase-locked loop.

24. The system of claim 20, wherein said gate array further includes a phase-locked loop.

25. The system of claim 18, wherein no two of said bursts in any one group are assigned the same frequency.

26. The system of claim 18, wherein there is unique correspondence between the value of any symbol and the frequency of any one of said bursts within the corresponding group.

27. The system of claim 18, whereby the control commands are classifiable into at least two classes, one class being a direct command and another class being a data message, wherein a direct command is encoded as a single symbol and a data message is encoded as a sequence of two or more successive symbols.

28. The system of claim 27, whereby a data message is represented by a plurality of bytes, wherein each byte is encoded as a sequence of two or more successive symbols.

29. The system of claim 18 further comprising a gate array, wherein any of said correlators are implemented within said gate array.

30. The system of claim 29 further comprising an electronic power converter and a digital controller operative to control said power converter, said digital controller being implemented within said gate array.

31. A method for transmitting data over power lines, the data being represented by a series of symbols, each symbol having one of a finite number of possible values, the method comprising:
encoding the series of symbols into a corresponding sequence of groups, each group consisting of N successive bursts of alternating signal, whereby each burst is assigned one of M possible frequencies; and
decoding a group of said successive bursts, upon reception, whereby the decoding includes:
- providing M reference signals, each having a unique one of said M frequencies, and correlating each of said bursts with said M reference signals, resulting in M correlation values for each burst,
- for each possible symbol value, selecting for each burst the correlation value that corresponds to the frequency assigned to that symbol value and adding all selected correlation values together, to yield a symbol score, and
- selecting the highest symbol score to indicate the decoded symbol value;

whereby said correlation, with respect to each of said M reference signals, includes:
providing the reference signal as a pair of binary valued reference signals, each having the corresponding frequency and being in mutual phase quadrature;
converting the received signal into a binary valued received signal;
performing a XOR operation between the binary valued received signal and each of the two binary valued reference signals;
providing a continuous train of clock pulses;
counting said clock pulses up or down according to the results of each of the two XOR operations, resulting, at the end of each burst in corresponding two count values; and
adding together the absolute values of said two count values.

* * * * *